Patented July 26, 1938

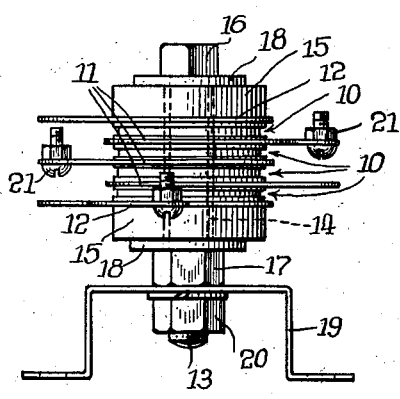
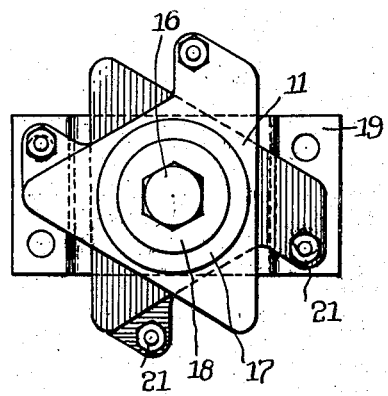
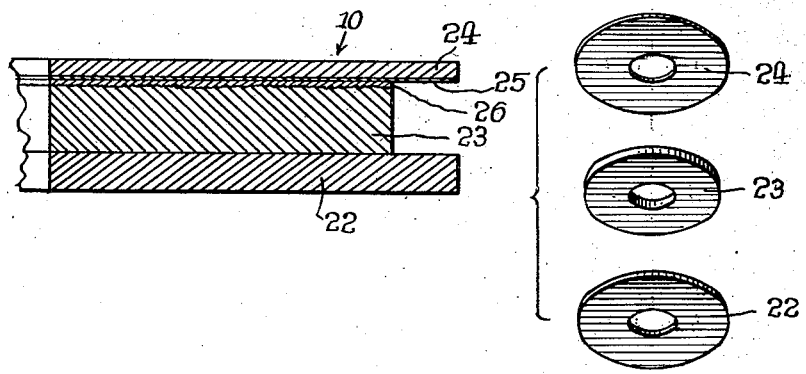

2,124,752

UNITED STATES PATENT OFFICE 2,124,752

RECTIFIER AND PROCESS OF MAKING SAME

Kurt E. Schimkus, Chicago, Ill., assignor, by mesne assignments, to P. R. Mallory & Co., Inc., Indianapolis, Ind., a corporation of Delaware Application June 25, 1934, Serial No. 732,242

13 Claims. (Cl. 175—366)

The invention relates to rectifiers and to a process of making same and more particularly has reference to rectifiers of the type known as dry surface contact rectifiers.

A general object of the invention is to provide a novel rectifier having higher efficiency, longer life, and a higher output capacity, and which is capable of withstanding a greater breakdown voltage than has heretofore been attained. Furthermore the general aim is to provide a novel process by which devices, which are substantially uniform in all material respects, may be easily produced on a commercial scale in a comparatively short time.

Another object is to provide, in a rectifier cell, a rectifying film having a manganese content and which is of exceeding hardness and is capable of withstanding high temperatures.

Another object is to provide an electronegative element for a rectifier which includes manganese in combination with one or more of the elements classified in Group VI, family B of the periodic system, more particularly selenium, tellurium and sulphur.

Another object is to provide an electropositive element which embodies a metallic member having, as a contact surface, a coating of a manganese compound, such as the oxide.

A further object resides in the provision of a new and improved process for producing rectifiers of this type and particularly the separate coacting elements of a rectifier cell. In this connection the novel process of producing the electronegative electrode includes the reduction and conversion of manganese oxide, preferably the monoxide, in the presence of a member of Group VI, family B of the periodic system. The improved process of producing the electropositive electrode includes the step of forming a manganese oxide film or coating on a surface of a metal plate which is preferably of aluminum or magnesium but may be a ductile alloy of either or both with manganese.

Another object is to provide a process which includes the step of forming a rectifying film between the contacting surfaces of a manganese compound film and the formed electronegative element, which film has a high manganese content imparting hardness and a high heat resisting characteristic thereto.

A further object is to provide a novel rectifying film embodying a metal sulphide which has, intimately associated therewith, an available supply of additional sulphur for replenishing possible sulphur losses due to operation, such additional sulphur being present in the form of the more or less unstable higher sulphide compounds of a metal.

More particularly stated, another object is to provide an electronegative element for a rectifier embodying an unstable metal sulphide of a higher valence combination than a more stable low valence sulphide of the metal whereby a reserve of active but combined sulphur is present in said electronegative element to form and maintain a rectifying sulphide film.

In conjunction with the foregoing, another object is to provide a novel process for producing an electronegative element containing as its principal ingredient a poly-sulphide compound of manganese.

Still another object resides in the provision of a rectifier of this character which embodies an electronegative element having a high valence sulphur compound of a metal and an electropositive element having a contact surface, for coaction with said electronegative element, which includes a compound (such as the oxide of said metal) capable of being converted into the metal sulphide by a reaction with part of the sulphur content of said high valence sulphur compound.

Other objects and advantages will become apparent in the following description and from the accompanying drawing, in which:

Figure 1 is a side view of a rectifier embodying the features of the invention.

Fig. 2 is a top plan view thereof.

Fig. 3 is a sectional view on an enlarged scale through a cell.

Fig. 4 is a distended perspective view showing the several elements of a cell.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawing wherein a rectifier construction has been shown in illustration of the invention, the reference numerals 10 designate generally the individual cells of the rectifier. While four cells are herein shown, this number may be varied according to the characteristics desired in a unit. The cells are preferably assembled one upon the other and are separated by contact plates 11 which extend outwardly beyond the peripheries of the cells. A plate 12 similar to the contact plates 11 is disposed at each end of the unit. The plates and cells are axially apertured to receive a securing bolt 13 or the like which is electrically insulated therefrom in any suitable manner as by a bushing 14 (Fig. 1). Engaging each of the plates 12 is a sturdy disk-like member 15 through which the bolt extends, and these members serve as pressure transfer elements in the application of pressure to the cells and plates as the structure is assembled. At one end a head 16 on the bolt bears against the associated member 15 while screw threads on the other end of the bolt are engageable by a nut 17 to secure the parts together under pressure ample to insure good electrical contact therebetween. Washers 18 are preferably interposed between the plates 12 and the head 16 and nut 17, respectively. A mounting bracket 19 may be securely clamped between the nut 17 and another nut 20 engaging the bolt.

As may be seen in Figs. 1 and 2 the plates 11 and 12 are similarly but irregularly shaped. In this instance each plate has substantially the form of an equilateral triangle and in assembly the plates have their apexes staggered or misalined. Thus, the apexes constitute outward extensions which, because of the irregular disposition of the adjacent plates, are spaced apart a distance which is substantially greater than that between adjacent plates. These plates are efficient heat radiating and disseminating means and the misalinement of the extensions increases their capacity for transfer of heat. The intermediate plates carry terminal screws 21 or the like by which proper electrical contact with the unit may be readily established.

Referring to Figs. 3 and 4 the structure and the process of making the cells will be described. Each cell comprises a base plate 22 and two electrodes 23 and 24, these electrodes in this instance being respectively electronegative and electropositive elements. The base plate 22 is a supporting member for the other elements and perfects electrical contact between the electronegative element 23 and the associated contact plate 11. Hence the plate 22 must be an electrical conductor and should be capable of establishing an efficient electrical connection between the parts it contacts. A steel plate coated with a thin film of lead has been found satisfactory.

The electronegative element 23 is in the form of a slug comprised primarily of a chemical compound or compounds from which a rectifying film may be obtained. According to the present invention, a metal is combined with an element classified in Group VI, family B of the periodic system, to produce a material which may then be formed into the desired shape for use. Manganese, because of its several advantageous properties (as will hereinafter be more fully explained) is preferably employed as the metal while sulphur is chosen as the element from the periodic table classification due to its inexpensiveness and because its combining properties with manganese effect an advantageous result.

Manganese has the property of combining with certain elements, of which sulphur is one, in several different atomic relationships according to its several valences. Barium has similar characteristics and could be used in place of manganese. Of the manganese sulphide compounds, the most stable is the mono-sulphide, the higher valence compounds being more or less unstable and tending to give up their excess sulphur content. Use is made of this characteristic in forming and maintaining the rectifying film.

Since the manganese-sulphur combination is preferred, further description will deal primarily with these materials. In producing the electronegative material, a quicker reaction can be obtained if a manganese compound having quick reaction properties, such as the monoxide, is employed. The quantity of sulphur is determined as being substantially that amount required to complete a reaction which will produce the highest valence sulphide compound of manganese. The sulphur and manganese monoxide are intimately mixed together, preferably in exceedingly finely divided form, and a reaction therebetween is caused, as by igniting the mixture. During ignition, air should be excluded in any suitable manner to prevent the formation of oxides. Since a portion of the sulphur is lost during the reaction, the resulting material appears to comprise a mixture of manganese sulphide, in the several valence forms thereof; that is to say, of the mono-, di- and tri-sulphides of manganese.

In addition to manganese and sulphur, a good conductor may be added to increase the conductivity of the electronegative element. Preferably a metal is chosen which when converted to a sulphide retains its current conducting properties and in addition the best results are obtained if the metal is one which will form an alloy with manganese. Carbon may also be used. Where the conductivity increasing metal is employed, the proportion thereof to the quantity of manganese monoxide used is not more, and is preferably less, than equal parts. Inclusion of such a metal in a formula will, of course, increase the quantity of sulphur necessary by the amount required to convert the metal into its sulphide. Where carbon is employed, however, the sulphur content is not materially increased but an excessive quantity of carbon is provided since a large part thereof is lost during ignition.

Mixtures of substances substantially according to the following exemplary formulae have been found to give satisfactory results:

| | Parts |
|---|---|
| Manganese (monoxide) | 59 |
| Copper | 58 |
| Sulphur | 65 | or

| | |
|---|---|
| Manganese (monoxide) | 59 |
| Iron | 52 |
| Sulphur | 64 |

The several materials in finely divided form are intimately mixed together and the mass is ignited to produce a mixture of the manganese mono-, di- and tri-sulphides. The iron or copper which are exemplary of suitable conductivity increasing metals are converted into their sulphides. The reason for choosing a metal which will alloy with manganese is that during ignition the intense heat, which is generated by the reaction, appears momentarily to alloy the manganese and the metal so that upon subsequent conversion to the sulphides a more thorough, intimate and uniform mixture results than could otherwise be obtained.

After completion of the reaction, the material is pulverized if necessary, and may then be formed into shape by a compression operation in a conventional type of press. It has been found that the finely divided material may, without the addition of a binder or similar agent, be formed into hard, impervious pieces, such as the washer-like slug shown in Fig. 4, possessing ample strength to withstand ordinary, somewhat careless handling. Moreover a pressing operation produces an element having substantially perfectly plane contact surfaces whereby the element is ready for immediate assembly without further treatment.

The electropositive element in its preferred form comprises generally a metallic current conducting strip having on one surface thereof a film of a compound which includes the principal metal present in the electronegative element (in this instance manganese) and is of such nature as to combine readily with sulphur to produce a rectifying film. A preferred compound is manganese oxide, and the film is indicated at 25 (Fig. 3). The metal on which the strip is preferably formed is aluminum or magnesium although satisfactory results may be obtained by using a magnesium-manganese alloy, an alluminum-magnesium alloy, or an aluminum-manganese-magnesium alloy. Since the metal must be ductile, the alloys contain less than approximately four-percent of manganese. The manganese oxide film may be formed on the metallic strip in any suitable manner as, for example, by immersing a magnesium strip in a solution of manganates which have been stabilized by the presence of a free alkali. In order to produce a uniform coating of manganese oxide, it is important that the surface of the metal strip to be coated be absolutely clean. In practice, therefore, one surface of the metal strip is burnished or otherwise suitably cleaned before the strip is immersed in the alkaline-manganate solution.

This process of forming the electropositive element lends itself nicely to quantity production, since a sheet of the metal of considerable size can be cleaned and immersed to produce a uniform coating thereover, after which the coated sheet is rinsed, dried, and rubbed or otherwise cleaned, to remove excess particles of the film. Following this, a plurality of uniform electropositive elements can be formed from the sheet by a stamping or like operation.

After the electropositive and electronegative elements have been formed, the elements of the cell are assembled together with an electronegative element 23 interposed between a base plate 22 and an electropositive element 24 with the film covered side of the electropositive element contacting the adjacent surface of the electronegative element. The assembled cell is then placed in a suitable clamping device and a forming current passed through the cell. This current produces a hard crystalline film 26 (Fig. 3) of metal compounds (sulphides, selenides or tellurides, depending upon which element has been used in the electronegative element) between the electronegative and electropositive elements.

In the preferred embodiment herein described the film consists primarily of manganese sulphide in its most stable mono-sulphide form.

It is to be noted that the contact surfaces of both the electropositive and electronegative elements have a high manganese content. During the formation of the rectifying film it appears that the hard crystals are produced on both contacting surfaces. Theoretically, the di- and tri-sulphide manganese compounds are converted, during the film formation, into the more stable manganese-mono-sulphide and the excess or released sulphur combines with the manganese of the film on the electropositive element resulting in a manganese mono-sulphide film on said element. Therefore, a rectifying film is formed on the electropositive element and also on the electronegative element, and it has been found that the two elements may be separated after the rectifying film has been formed without materially affecting the operation or efficiency of the cell. Fig. 3 is illustrative of a cell after formation and the two films are shown as one thickness, indicated at 26, since there is no definite separating line unless the two elements are taken apart. Upon separation, however, a rectifying film will be found on both elements. This is the reason why cells produced by this process will withstand exceedingly rough usage and treatment. Moreover, the rectifying film is extremely hard and will withstand high temperatures and, it has been found, is completely formed in a shorter length of time than has heretofore been deemed possible. Moreover all of the sulphur from the di- and tri-sulphide is not consumed in forming the rectifying. Hence a reserve supply of active combined sulphur is always available to maintain the film during operation of the cell.

The film thus formed functions to prevent a current flow therethrough in one direction but permits a current flow in the opposite direction. After the cells have been formed, a suitable number are assembled into a rectifier structure, such as that shown in Fig. 1, although it is possible to first assemble the individual elements of the cells into such a structure and then form the cells to produce the rectifying film. As is well understood, the relationships of the cells to each other in the assembled unit determines whether the unit is a half-wave or a full-wave rectifier. As may be seen in Figs. 1 and 3 the plate 22 and the electropositive element 24 are of greater diameter than the electronegative element 23. Hence when pressure is applied through the large disk members 15 the force is uniformly distributed across the contacting surfaces to bring every portion of such surfaces, and particularly those on the electropositive and electronegative elements, into intimate contact. In consequence a uniform and evenly distributed rectifying film is produced which covers the entire surface area of the electronegative element and enhances the output efficiency of the device.

From the foregoing it will be evident that an improved rectifier has been provided. By actual comparative tests made between a rectifier produced according to the present invention and similar cells now on the market, it has been ascertained that my device has approximately twice the output capacity of the commercial units and will stand about twice the break-down voltage. The instant devices will withstand long usage and in operation are highly efficient. By the improved process which has been described, rectifiers which have exceedingly uniform characteristics may be quickly and easily produced on a commercial scale, whereby manufacturing costs are materially reduced.

I claim as my invention:

1. A rectifier cell comprising, in combination, an electrode embodying manganese combined with one or more elements from Group VI, family B of the periodic system (selenium, tellurium, sulphur), and a complementary electrode including one or more of the lighter electropositive metals and having a surface of manganese oxide for contact with said first mentioned element.

2. The process of forming an electrode for a rectifying cell which includes the steps of cleaning a surface of a strip of an electropositive metal selected from the group magnesium, aluminum and magnesium-aluminum alloy, depositing on said surface a coating of manganese oxide, drying and cleaning said coating, and cutting the strip to form a plurality of uniformly similar electrodes.

3. In the process of forming an electrode for a rectifying cell the steps of reducing manganese oxide to a high valent compound of manganese and a member of Group VI, family B of the periodic system, and forming an electrode from the resulting compound.

4. In the process of forming an electrode for a rectifying cell the steps of intimately mixing finely powdered manganese and sulphur in proportions substantially according to their combining weights so as to produce a high valent manganese sulfide, igniting the mixture in the absence of air, and forming an electrode from the resulting compound.

5. The process of forming an electrode for a rectifying cell which includes the steps of intimately mixing finely divided materials substantially according to the formula; at least fifty percent of manganese oxide, not to exceed the same amount of a current conducting metal, and a member of Group VI, family B of the periodic system in quantity at least sufficient to combine completely with the other materials, effecting a chemical reaction between the materials, and forming an electrode of the resulting material.

6. In a rectifier cell, the combination of an electronegative element which predominately includes the higher valence sulphide compounds of manganese, and an electropositive element having a contacting surface including a manganese compound capable of being converted into a low valence sulphide compound of manganese.

7. The process of forming an electronegative element for a rectifying cell which includes the step of transforming an intimate mixture of manganese monoxide and copper into the sulphides thereof by ignition in the presence of a quantity of sulphur in excess of that quantity necessary to produce the lowest valence sulphides.

8. The process of forming an electrode for a rectifying cell which includes the step of subjecting an electropositive metallic member of a character capable of receiving a surface film of manganese oxide to the action of a solution of a manganate stabilized by the presence of free alkali to produce a manganese oxide film on said member.

9. A rectifier of the sulphide dry surface contact type formed from a first electrode including manganese oxide and a second electrode including manganese poly-sulphide, and having interposed between them a hard rectifying film or layer capable of withstanding high temperatures, said film comprising the electrochemical reaction product between said first and second electrodes.

10. A rectifier cell comprising in combination, an electrode embodying a metal from the group including manganese and barium combined with one or more elements from Group VI, family B, of the periodic system, and a complementary electrode including one or more of the lighter electropositive metals and having a surface including an oxide of said first mentioned metal in engagement with the first mentioned electrode.

11. A rectifier cell comprising in combination, an electrode embodying a metal from the group including manganese and barium combined with one or more elements from Group VI, family B, of the periodic system, and a complementary electrode including one or more metals from the group including magnesium, aluminum and manganese and alloys of the same and having a surface film including an oxide of the first mentioned metal.

12. A rectifier cell comprising in combination, an electrode embodying a metal from the group including manganese and barium combined with one or more elements from the group including sulphur, selenium and tellurium in such proportions as to form a polyvalent compound thereof, and a complementary electrode having a surface which includes an oxide of said metal.

13. A rectifier cell comprising in combination, an electrode embodying a metal from the group including manganese and barium combined with one or more elements from the group including sulphur, selenium and tellurium in such proportions as to form a polyvalent compound thereof, and a complementary electrode including one or more metals from the group including magnesium, aluminum and manganese and alloys of the same and having a surface film including an oxide of the first mentioned metal.

KURT E. SCHIMKUS.